(No Model.)
A. B. SHAW.
METHOD OF AND APPARATUS FOR CONSTRUCTING PNEUMATIC TIRES FOR BICYCLES.
No. 534,619. Patented Feb. 19, 1895.
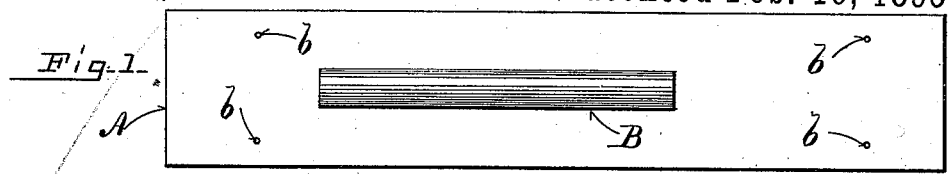
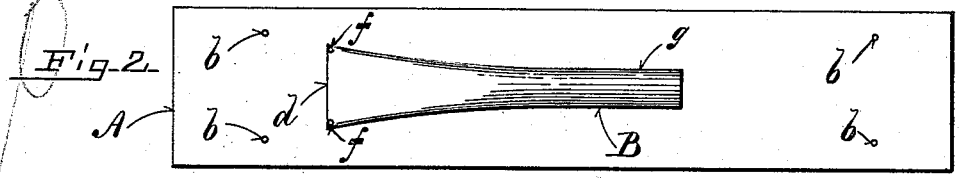
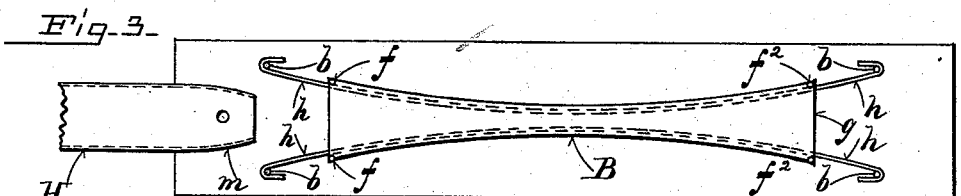
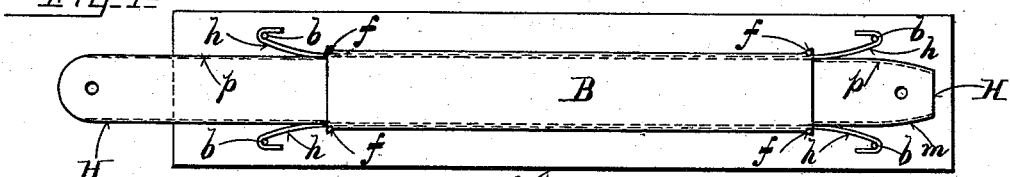
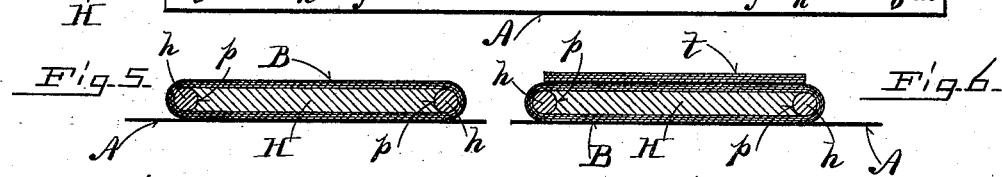
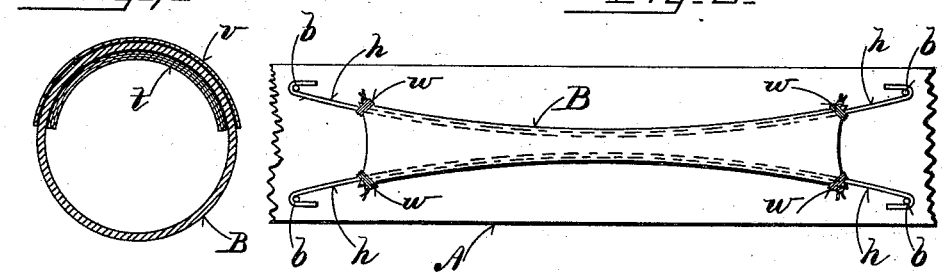

UNITED STATES PATENT OFFICE.

AI B. SHAW, OF MEDFORD, MASSACHUSETTS, ASSIGNOR TO THE SELF-SEALING BICYCLE TIRE COMPANY, OF PORTLAND, MAINE.

METHOD OF AND APPARATUS FOR CONSTRUCTING PNEUMATIC TIRES FOR BICYCLES.

SPECIFICATION forming part of Letters Patent No. 534,619, dated February 19, 1895.

Application filed March 5, 1894. Serial No. 502,355. (No model.)

*To all whom it may concern:*

Be it known that I, AI B. SHAW, of Medford, in the county of Middlesex, State of Massachusetts, have invented certain new and useful Improvements in Methods of and Apparatus for Constructing Pneumatic Tires for Bicycles, of which the following is a description sufficiently full, clear, and exact to enable any person skilled in the art or science to which said invention appertains to make and use the same, reference being had to the accompanying drawings, forming part of this specification, in which—

Figure 1 is a plan view of the bench used in my process with a section of deflated tubing thereon; Fig. 2, a like view showing one end of the tube stretched and secured to the bench; Fig. 3, a plan view showing the guide wires inserted in the tube and the spreader in position to be entered therein; Fig. 4, a plan view showing the tube stretched laterally; Fig. 5, a vertical transverse section of the parts as shown in Fig. 4; Fig. 6, a like view showing the extra ply attached to the tube; Fig. 7, a vertical transverse section of the completed tube, and Fig. 8 a plan view showing an alternative method of securing the tube to the stretching wires.

Like letters of reference indicate corresponding parts in the different figures of the drawings.

My invention relates especially to the construction of the inner or inflatable tubing employed for pneumatic tires for bicycles whereby when accidentally punctured it will automatically seal or close the opening thus formed and prevent the escape of air. In carrying out my improvement I make use of means which will be readily understood from the following explanation.

In the drawings, A represents a bench of any suitable construction. At each end of the bench a determined distance apart studs, $b$, are arranged. A section of rubber tubing B of the ordinary quality employed in manufacturing bicycle tubing is disposed on the bench and one end, $d$, thereof is spread or stretched laterally and secured by nails, $f$, (see Fig. 2) to the bench. This lateral stretching is continued at this point to nearly the capacity of the material. The free end, $g$, of the tube is then grasped and the tube stretched lengthwise and said end, $g$, also stretched laterally and secured by nails, $f^2$, to the bench the same distance apart as the nails, $f$. The process of stretching thus far causes the center of the tube to sag or be much narrower than at the ends as shown in Fig. 3. It is necessary to stretch all portions of said tube laterally a like amount and to accomplish this I employ the following apparatus which successfully overcomes all the difficulties of friction against the tube when inserting a rigid spreader therein. Two wires, $h$, are passed through the tube the ends of said wires being hook shaped and clasped around the pins, $b$, on the bench. A flat board or metallic plate, H, is now employed as a spreader. This plate has its end slightly reduced at, $m$, and its edges are grooved longitudinally at, $p$, to receive the wires, $h$. Entering said wires in the groove the spreader can readily be forced through the tubing, $b$, the wires acting as a track therefor and serving to reduce the friction of the spreader on the rubber so that no further longitudinal stretch is imparted to the tube while it is forced laterally outward until all parts are stretched equally and the position shown in Figs. 4 and 5 is assumed. The tubing is not flattened its vertical diameter being only the thickness of the spreader, H. To one face of the flattened tube and entirely covering the same I cement a sheet of rubber, $t$, in its normal or undistended condition where it is allowed to remain until the cement is firmly dried or set. The spreader, H, is withdrawn from the tube which is detached from the bench by removing the nails, $f$, and said tube is withdrawn from the wires, $h$, releasing entirely the strain on the body of the tube which contracting upsets or compresses the sheet, $t$, to a marked degree. As some resistance is offered by the sheet, $t$, the material of the main tube cannot recover entirely and the tube in this condition is distended or warped considerably from a cylindrical form. I now turn the tube outside in so that the sheet, $t$, is at the thread portion of the completed tube as shown in Fig. 7. The ends of the tubing are joined together to form the tire by any suitable means and the tire can be inflated in the usual manner. This tubing when disposed within the casing and inflated has all the properties of the ordinary tube. Should the tire be accidentally punctured it will be found that as soon as the puncturing article is withdrawn the tension of the outer body of the tube acting upon the upset inner portion or sheet, *t*, will cause the opening formed by said article in said inner portion or sheet to be immediately drawn together or sealed thereby and prevent the escape of air from within the tube. As specified, the tube B, being still expanded or stretched slightly after being attached to the ply or sheet, *t*, the opening formed by puncturing will enlarge or flare somewhat. To overcome this when the tube has been formed as above, I cement a ply, *v*, of linen or thin canvas or similar textile material (see Fig. 7) to the thread portion of the outer face of the tire or so much thereof as will cover the area as the sheet, *t*. When punctured through this reinforcing strip which does not in any manner affect the sealing qualities of the inner ply, *t*, said strip, *v*, will prevent the flaring of the opening in the main or outer tube, *b*, as it serves to hold all portions thereof and prevent further stretching.

In Fig. 8 the ends of the tube, B, are secured by tying at, *w*, directly to the rods or wires, *h*.

I do not confine myself to any particular form of wires or of the spreader; nor do I wish to be confined to the means described for holding the tube when stretched.

Having thus explained my invention, what I claim is—

1. That improvement in the method of making inflatable tubing for pneumatic tires which comprises stretching the tube laterally at one end and securing said end to a support; then stretching said tube longitudinally and its opposite end laterally and securing it to a support; disposing a track or way longitudinally within said tube; inserting a spreader in said tube on said way whereby the tube is stretched laterally throughout its length; securing a portion of rubber in its normal condition to a face of said tube; then releasing said tube whereby said portion of rubber is upset or contracted.

2. That improvement in the method of making inflatable tubing for pneumatic tires which comprises stretching said tube longitudinally and laterally throughout its entire length and supporting said tube in its stretched condition; securing a sheet of rubber in its normal condition to a portion of the surface of said tube; releasing the tube and turning it outside in whereby said sheet is upset.

3. That improvement in the method of making inflatable tubing for pneumatic tires which comprises stretching a section of rubber tubing both lengthwise and laterally, and holding the same by securing the ends thereof to a support; disposing detachable slide ways within said tube; entering a spreader into the tube on said ways; securing a sheet of rubber in its normal condition to a portion of the outer surface of said tube while in its stretched condition; removing the tube from the spreader and ways; turning said tube outside in and securing a sheet of textile material to its outer surface.

4. That improvement in the method of making inflatable tubing for pneumatic tires which comprises stretching a section of tubing longitudinally and laterally throughout its entire length; supporting the tube in such stretched condition; securing a portion of rubber in its normal condition to the outer face of said tube; releasing said tube and turning the tube outside in whereby said portion is upset or contracted and securing a portion of textile material to the outer face of said tube.

5. As an improved article of manufacture the herein described inflatable tubing for bicycles having a ply of rubber secured to its inner surface while said tube is stretched in all directions and compressed in all directions and held by the contraction of said tube; and a ply of textile material secured to the outer face of said tube.

6. The herein described apparatus for preparing rubber tubing for bicycle tires which comprises a bench or support; flexible ways for insertion in said tubing; devices for attaching the ways to said support and a spreader fitted to slide on said ways.

7. The herein described apparatus for the purposes specified comprising flexible slide-ways adapted for insertion in a rubber tube; devices for securing said ways to a support and a spreader fitted to slide on said ways whereby the tube may be spread laterally, substantially as and for the purpose set forth.

8. The combination with the support, of the flexible ways, *h'*, devices for detachably securing the same to the support and the spreader H, grooved to engage said ways.

AI B. SHAW.

Witnesses:
K. DURFEE,
O. M. SHAW.